Jan. 26, 1965 I. BUCK 3,167,616

DIAL, PARTICULARLY FOR USE IN TELEPHONE APPARATUS OR THE LIKE

Filed March 23, 1961

Inventor:
Immanuel Buck
By Ernest G. Montague
attorney 3,167,616

DIAL, PARTICULARLY FOR USE IN TELEPHONE APPARATUS OR THE LIKE

Immanuel Buck, Justinus-Kerner-Weg 9, Fellbach, Stuttgart, Germany

Filed Mar. 23, 1961, Ser. No. 97,895
Claims priority, application Germany, Mar. 23, 1960, B 57,160
2 Claims. (Cl. 179—90)

Figure 1:
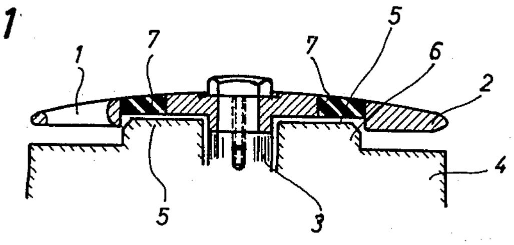

The present invention relates to a dial as used particularly in telephone apparatus, but also in other electromechanical dialling and switching devices for adjusting any combination of figures or letters.

The construction of such dials in the form of perforated plates mounted rotatably on a stationary plate or disc are known in the art, a figure or letter provided on the stationary plate being in register with each of the perforations of the dial plate. However, such arrangement involves the disadvantage that owing to their recessed position relative to the dial plate, the symbols are fully visible only if the eyes of the dialling person are positioned approximately axially relative to the dial plate perforations. The webs between the dial plate perforations obstruct th eview of the dialling person still further while the dial plate returns over the symbols, a condition which is terminated only as the dial plate stops. As a result, the eye can seek the next digit to be dialled and adjust itself thereto only, when the return travel of the dial plate is completed. Another disadvantage of the known arrangement which must be mentioned is, that the symbols are located in the direct range of contact of the dialling finger so that there is danger that they will become illegible sooner or later by abrasion and contamination.

To correct tthese disadvantages, it has been proposed to provide the figures or letters on the dial plate itself, either outside or inside the circle of perforations. While solving the problem of lighting of the symbols and their durability, this does not solve the problem of quick and effortless reading thereof. When the dial plate returns, the symbols will rotate along with it, so that even then the dialling person can only seek the next diigt to be dialled, when the return travel of the dial plate is terminated. If the symbols are arranged inside of the circle of perforations, which must be considered as normal in view of the need to conserve space, there is the added consideration that the symbols must be smaller than if they were arranged within the circle of perforations itself.

The present invention has as one of its objects to provide a dial particularly for use in telephone apparatus or the like, which avoids the aforementioned disadvantages and permits effortless, rapid dialling of any desired combination of figures or letters.

It is another object of the present invention, to provide a dial, particularly for use in telephone apparatus or the like, wherein the dial symbol are arranged in a stationary arrangement inside or outside of the circle of perforations of the rotatable dial plate.

It is yet another object of the present invention to provide a dial, particularly for use in telephone apparatus or the like, wherein the individual symbols may be distinguished still better one from the other by different contrasting colors, bringing about the great advantage that the dial symbols remain stationary at all times, are not concealed even temporarily, are well lighted at all times and thus enable the dialling person to prepare himself for a new digit while the dial plate return travel still continues.

Figure 2:
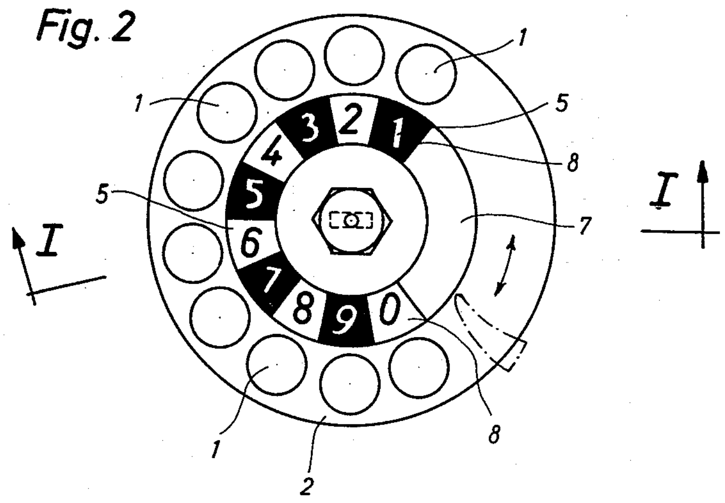

With these and other objects in view, which will become apparent in the following detailed description, the present invention will be clearly understood in connection with the accompanying drawing, in which:

FIGURE 1 is a cross-section of a telephone dial along the lines I—I of FIG. 2; and FIG. 2 is a plan view of the dial shown in FIG. 1.

Referring now to the drawings, the dial comprises a dial plate 2 made of metal or plastic materials, provided with finger holes 1 and supported for rotation by means of a shaft 3 in the housing 4 of a dial telephone. The dial symbols 5, in the present instance figures one through zero, are provided on a cylindrical shoulder 6 of the housing 4, the shoulder 6 projecting into the dial plate 2 from below. In order that said symbols 5 can be seen from above, the dial plate 2 has a suitably positioned transparent ring 7 made of transparent plastic material or the like. The ring 7 and the dial plate 2 may either be made in one piece, or the ring 7 may be inserted into the dial plate 2 as a separate component.

In the above embodiment, the dial symbols 5 are each provided on a panel 8, which is distinguished from the directly adjacent panel by contrasting colors such as black and white as shown.

The present invention is not limited to the embodiment illustrated, but may take different forms of construction. Thus, as already mentioned, it would alternatively be possible to provide the dial symbols 5 on a stationary external ring laid concentrically around the dial plate 2. Moreover, the dial plate 2 could have the form of an annular plate rotating around a stationary inner plate carrying the dial symbols. A hollow shaft could, if necessary, be employed to support such an annular plate. In both instances, the dial symbols could be provided on the uppermost surfaces for optimum visibility.

While I have disclosed one embodiment of the present invention, it is to be understood that this embodiment is given by example only and not in a limiting sense, the scope of the present invention being determined by the objects and the claims.

I claim:

1. A dialing device for telephone apparatus and the like comprising
   a stationary housing haivng an upwardly extending centrally disposed cylindrical portion,
   a circular dial plate rotatably mounted on top of and slightly spaced apart from said cylindrical portion and of a diameter larger than that of said cylindrical portion to provide an annular zone extending beyond said cylindrical portion of said stationary housing.
   said annular zone of said circular dial plate defining a plurality of finger holes disposed along a circular line,
   a plurality of dial symbols provided along a circular line on the top face of said cylindrical portion and coordinated to said finger holes of said circular dial plate,
   said dial plate having a transparent annular zone disposed axially above said dial symbols, so that the latter are clearly, fully and continuously visible during rotation of said dial plate, as well as during its resting position, and
   said dial plate having an annular recess at its bottom face complementary to and receiving the upper end of said cylindrical portion in order to dispose said symbols within close vicinity of the bottom face of said transparent annular zone of said dial plate.

2. The device, as set forth in claim 1, wherein
   said transparent annular zone of said dial plate.
   lindrical portion form an annular zone thereon below said transparent annular zone of said dial plate,
   said annular zone of said dial symbols is divided into a plurality of ring sectors, and
   each of said ring sectors bearing a dial symbol and having a color different from that of the adjacent ring sectors.

References Cited by the Examiner

UNITED STATES PATENTS

| | | | |
|---|---|---|---|
| 1,538,354 | 5/25 | Richter | 179—90 X |
| 2,061,097 | 11/36 | Fordyce | 179—90 X |
| 2,244,609 | 6/41 | Cosgrove | 179—90 |
| 2,359,841 | 10/44 | Gaff et al. | 179—90 |

FOREIGN PATENTS

| | | |
|---|---|---|
| 56,782 | 3/33 | Norway. |
| 732,231 | 6/55 | Great Britain. |
| 1,132,131 | 10/56 | France. |

ROBERT H. ROSE, *Primary Examiner.*